Figure 2:
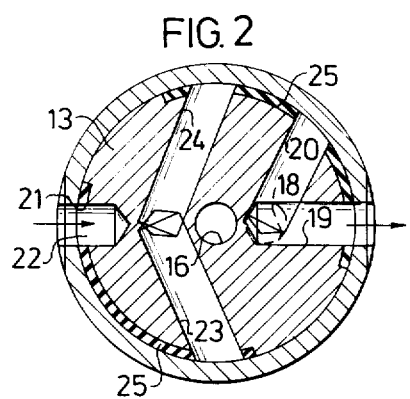

United States Patent [19]

Bengtsson

[11] 4,033,880

[45] July 5, 1977

[54] FILTER DEVICE

[76] Inventor: Göran Vilhelm Bengtsson, Pianogatan 84, S-421 44 Vastra Frolunda, Sweden

[22] Filed: Apr. 5, 1976

[21] Appl. No.: 673,778

[30] Foreign Application Priority Data

Apr. 11, 1975 Sweden ............................. 7504194

[52] U.S. Cl. ........................ 210/424; 137/625.21; 210/444; 251/311
[51] Int. Cl.² ........................................ B01D 29/42
[58] Field of Search .......... 210/424, 420, 422, 190, 210/228, 444; 137/625.17, 625.19, 625.21, 625.46, 595; 251/311

[56] References Cited
UNITED STATES PATENTS 953,637 3/1910 McCollom .................... 210/424 X Primary Examiner—Frank W. Lutter
Assistant Examiner—William A. Cuchlinski, Jr.
Attorney, Agent, or Firm—Allison C. Collard

[57] ABSTRACT

A filter device, particularly a dry filter device for refrigerant in cooling systems, comprises an inlet- and outlet-equipped housing having a chamber containing the filter, which chamber has a sealable aperture for allowing replacement of the filter in the chamber, and a valve having a valve body which in an operating position establishes communication between the inlet and the outlet via the chamber containing the filter and which in a service position establishes communication between the inlet and the outlet around the chamber containing the filter to allow replacement of the filter. The valve body has an evacuation position in addition to the two said positions, in which evacuation position said valve body seals the inlet and establishes communication between the chamber containing the filter and the outlet.

7 Claims, 3 Drawing Figures

U.S. Patent

July 5, 1977

4,033,880

FILTER DEVICE

The present invention relates to a filter device, particularly a dry filter device for refrigerant in cooling systems, comprising an inlet- and outlet-equipped housing having a chamber containing the filter which chamber has a sealable aperture for allowing replacement of the filter in the chamber and a valve having a valve body which in an operating position established communication between the inlet and the outlet via the chamber containing the filter and which in a service position establishes communication between the inlet and the outlet around the chamber containing the filter to allow replacement of the filter.

A filter device of the above type is previously known, for example from Swedish Patent Application No. 7302812-8 in which the valve body is formed by a piston displaceably disposed in the filter housing which body when the filter is in place is held in the operating position by the filter. The housing aperture is sealed by a screw top which holds the filter in place. When the top is unscrewed for replacement of the filter the piston is displaced by the action of a powerful spring towards the aperture and gradually reaches the service position. The advantage of this device is that the change-over takes place automatically. The disadvantage is that the housing is under pressure when the top is unscrewed. The overpressure in the housing, which in cooling systems can be about 15 kp/cm$^2$, causes the top to stick and may make it difficult for the top to be loosened. It is, in addition, a disadvantage that medium under high pressure is released to the surroundings, particularly if the medium is a liquid. There is also a danger that the top will be "shot" from the housing if there has not been a sufficient pressure drop before the cessation of thread engagement between the housing and the top.

The purpose of the present invention is to effect a filter device of the type disclosed in the introduction which eliminates the above disadvantages by permitting reduction of pressure in the housing prior to loosening the top.

This is achieved according to the invention by providing the valve body with an evacuation position in addition to the two said positions. In the evacuation position the valve body seals the inlet and establishes communication between the chamber containing the filter and the outlet.

Because the inlet can be closed to interrupt the supply of medium to the chamber containing the filter at the same time as the outlet is kept open, the pressure in a cooling system, for example, can be reduced from about 15 kp/cm$^2$ t about 2 kp/cm$^2$ by the cooling compressor. After this reduction of pressure the top can be unscrewed by hand without the aid of tools and only a lesser quantity of medium at low pressure is released to the surroundings.

Figure 3:
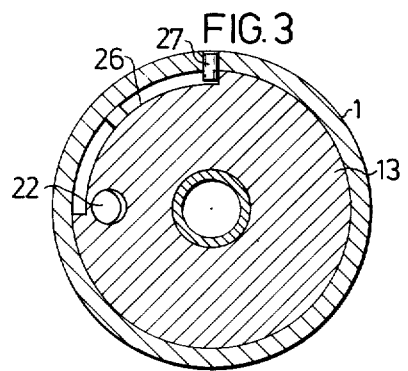
Figure 1:
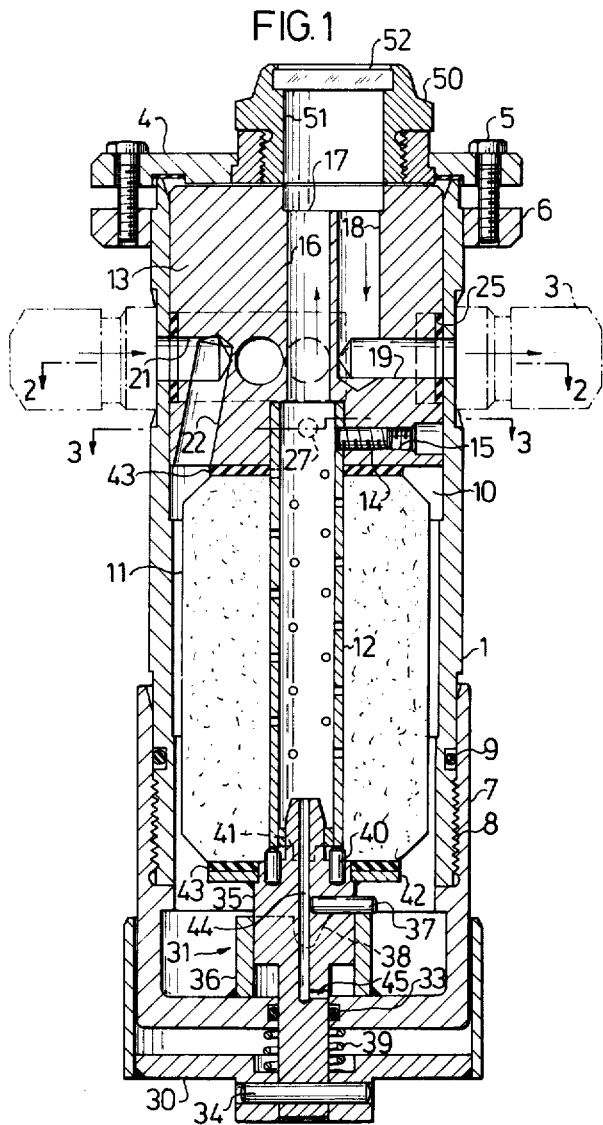

The invention is described in detail with reference to an embodiment shown on the attached drawing in which FIG. 1 shows a longitudinal section through a filter device, FIG. 2, a cross section along the line 2—2 in FIG. 1 and FIG. 3 a cross section along the line 3—3 in FIG. 1.

The filter device as shown has a cylindrical housing 1 with an inlet connection 2 and an outlet connection 3. At the top the housing is sealed by a top 4 which is held in place by screws 5 which are screwed into a flange 6 on the housing. At the bottom the housing is sealed by a top 7 with internal threads 8 which engage corresponding external threads on the housing. An O-ring gasket 9 in a groove in the housing forms a seal against the top 7. A filter member 11 made, for example, of silica gel is placed in the chamber 10 of the housing 1 which member surrounds a centrally placed perforated tube 12.

In the chamber 10 above the filter member 11 a valve body in the form of a piston 13 is disposed into which the perforated tube 12 projects and is fixed by means of a screw 14 in a threaded drilling 15 in the piston 13. The tube 12 opens into a central drilling 16 in the piston which opens into a recess 17 in the upper surface of the piston. A drilling 18 issues from the recess 17 and from this drilling two drillings 19 and 20 (see FIG. 2 in particular) which open into the envelope surface of the piston 13. The openings of the drillings 19 and 20 have an angular distance of 45° and lie in the same plane as the opening of the outlet connection 3 in the chamber 10. The drilling 16, the recess 17 and the drillings 18, 19 and 20 thus form two angularly displaced outlet ducts from the chamber 10 to the connection 3. A drilling 21 issuing from the piston envelope surface which drilling in the piston position shown in the figures lies opposite the inlet connection 2 opening and a drilling 22 issuing from said opening and opening onto the underside of the piston form the inlet duct from the connection 2 to the chamber 10 on the surface of the filter member 11. Two additional drillings 23 and 24 in the piston 13 form a through duct with diametrically opposed openings which lie in the same plane as the inlet and outlet connection openings. The openings of the ducts 23, 24 are displaced 90° from the openings of the inlet duct 21, 22 and of the one outlet duct 16, 17, 18, 19 in the piston envelope surface.

In the position of the piston 13 shown in the figures medium flows from the inlet connection 2 via the inlet duct 21, 22 to the chamber 10 through the filter member 11 into the tube 12 and via the outlet duct 16, 17, 18, 19 to the outlet connection 3. If the piston 13 is rotated 45° clockwise, as seen in FIG. 2, its envelope surface seals the inlet connection openinig in the chamber 10 and simultaneously establishes communication between the outlet duct 16, 17, 18, 20 and the outlet connection 3 so that the pressure in the chamber 10 can be reduced via this connection. By rotating the piston an additional 45° in the same direction direct communication is established between the inlet connection 2 and the outlet connection 3 via the duct 23, 24. To achieve effective sealing between the piston and housing wall, the piston in the region of the duct openings in the envelope surface is furnished with sealing strips 25 inserted in recesses. In addition, the piston 13, as shown in FIG. 3, is made with a groove 26 into which a pin 27 in the housing wall projects, in part to locate the piston axially and in part to determine its two end positions in the turning.

The turning of the piston 13 is achieved by means of a control knob 30 on the outside of the top 7 and a turning mechanism generally designated 31. Said mechanism comprises a spindle 32 which is passed through a drilling in the top 7, an O-ring gasket 33 forming a seal for the passage. The knob 30 is secured on the spindle by a cotter pin 34. The spindle 32 is integral with a cylindrical body 35 which is rotatably and slidably journalled in a bush 36 rigidly joined to the top. The cylindrical body 35 has a pin 37 which engages the upper edge of the bush 36 and upon turning of the spindle is insertable into a recess 38 when the spindle and the cylindrical body are simultaneously displaced outwards by the action of a spring 39 disposed between the top 7 and the knob 30. In the shown embodiment the transfer of the turning of the spindle 32 to the tube 12 so as to turn the piston occurs by means of pins 40 which engage corresponding recesses 41 in the lower end of the tube. The cylinder body may alternatively be made with a star shaped tip (as a Phillips screwdriver) and the lower end of the tube furnished with corresponding indentations.

In replacing the filter member 11 which is loosely threaded onto the tube 12 and is fixed in place between the piston 13 under surface and a flange 42 on the cylindrical body 35 under spacers of packings 43, the knob 30 is first turned 45° whereby the piston 13 is set to allow evacuation of the chamber 10 as described above. Thereafter the knob 30 is turned an additional 45° whereby direct communication is established between the inlet 2 and the outlet 3. At the end of the last turning movement the pin 37 is inserted into the recess 38 so that the cylindrical body 35 is displaced outwards and the pins 40 are disengaged from the recesses 41 in the tube 12. If a residual lesser overpressure prevails in the chamber 10, a pressure equalization takes place via the pressure equalization ducts 44 and 45 due to the fact that the latter duct 45 upon displacement of the spindle 32 ends up on the outside of the top 7. Thereafter the top 7 can be unscrewed in a normal manner without the obstruction of the turning mechanism 31 and the filter can be removed and replaced with a new one, whereupon the return of the filter device to operation takes place in reverse order.

So that it will be possible to conveniently determine when a filter change is suitable, the upper top 4 is furnished with an attachment 50 having a through drilling 51 whose outer end is connected to a glass or plastic window 52. The drilling 51 is located opposite the recess 17 in the piston 13 so that it is possible to observe the filtrate or an indicator, eg a moisture indicator, around which the filtrate flows.

What I claim is:

1. A filter device, particularly a dry filter device for refrigerant in cooling systems, comprising a filter housing having a chamber containing a filter and a single inlet (2) into a chamber (10) and a single outlet (3) from said chamber (10), said chamber (10) having a sealable opening for allowing replacement of said filter in the chamber (10), and a valve means disposed between said inlet (2) and said outlet (3) and having a movable valve body (13), said valve body (13) having an operating position in which it establishes communication between said inlet (2) and said outlet (3) through the filter in said chamber (10), an evacuation position, in which it closes said inlet (2) and establishes communication between said chamber (10) and said outlet (3) only, and a service position, in which it establishes a communication between said inlet (2) and said outlet (3) by-passing said chamber (10) in order to maintain a flow of refrigerant from said inlet (2) to said outlet (3) during replacement of the filter.

2. The filter device as recited in claim 1 wherein the evacuation position of said valve body (13) lies between the operating position and the service position, whereby evacuation of the chamber (10) containing the filter automatically takes place when the valve body is switched from the operating position to the service position.

3. The filter device as recited in claim 1 wherein said housing includes sidewalls defining at least partly said chamber and wherein said valve body (13) comprises a piston, having an outer envelope surface, which is movably disposed in the chamber containing the filter and engages the side walls of the chamber (10), said side walls have apertures found therein which define said single inlet (2) and said single outlet (3), said piston (13) having ducts (16, 17, 18, 19, 20, 21, 22, 23, 24) opening into its envelope surface which establish said various communications beteen the inlet (2), the chamber (10) containing the filter and the outlet (3) depending on the position of the piston (13).

4. The filter device as recited in claim 3, wherein the filter 11 has a center duct, the piston (13) is rotatably mounted and said device additionally includes a control means 30 outside of the filter housing (1), a turning mechanism connected to the control means 30 and a central perforated tube (12) which projects into the chamber (10) containing the filter and is adapted to penetrate the central duct in the filter (11), one end of which is secured to the piston and the other end (12) of which is adapted to engage the turning mechanism (31).

5. The filter device as recited in claim 4, wherein the piston has an inlet duct (21, 22) which opens into the chamber (10) containing the filter outside of the filter (11), two outlet ducts (16, 17, 18, 19, 20) which open into the central tube (12) and a by-pass duct (23, 24) which has its two openings in the envelope surface of the piston, all openings being so angularly spaced from one another that in the operating position, the inlet duct (21, 22) and the one outlet duct (16, 17, 18, 19) communicate with the housing inlet (2) and outlet (3) respectively, that in the evacuation position, the other outlet duct (16, 17, 18, 20) communicates with the outlet (3) while the piston (13) seals the inlet (2), and that in the service position, the inlet and the outlet communicate with one another via the by-pass duct (23, 24).

6. The filter device as recited in claim 5 wherein said filter housing has a window and the outlet ducts have a section (17) which is open to the window (52) in the filter housing to allow inspection of the filtrate.

7. The filter device as recited in claim 6 wherein said housing has a threaded top which seals the filter housing aperture and the turning mechanism (31) and the control means (30) are located on the threaded top (7), the turning mechanism (31) and the control means (30) being axially displaceable relative to the top (7) so as to allow the tube (12) to be disengaged from the turning mechanism and to permit the top to be unscrewed.

* * * * *